United States Patent
Wu

(10) Patent No.: US 9,797,478 B2
(45) Date of Patent: Oct. 24, 2017

(54) ELECTRICALLY POWERED GEAR BOX FOR A SEMITRAILER STABILIZER

(71) Applicant: GUANGDONG FUWA ENGINEERING MANUFACTURING CO., LTD., Guangdong (CN)

(72) Inventor: Zhiqiang Wu, Guangdong (CN)

( * ) Notice: Subject to any disclaimer, the term of this patent is extended or adjusted under 35 U.S.C. 154(b) by 315 days.

(21) Appl. No.: 14/441,528

(22) PCT Filed: Jan. 9, 2013

(86) PCT No.: PCT/CN2013/070272
§ 371 (c)(1),
(2) Date: May 8, 2015

(87) PCT Pub. No.: WO2014/071699
PCT Pub. Date: May 15, 2014

(65) Prior Publication Data
US 2015/0300455 A1    Oct. 22, 2015

(30) Foreign Application Priority Data
Nov. 9, 2012   (CN) .......................... 2012 1 0446270

(51) Int. Cl.
*F16H 3/34*   (2006.01)
*B60S 9/04*   (2006.01)

(52) U.S. Cl.
CPC . *F16H 3/34* (2013.01); *B60S 9/04* (2013.01)

(58) Field of Classification Search
CPC ...................................... F16H 3/34; B60S 9/04
See application file for complete search history.

(56) References Cited

U.S. PATENT DOCUMENTS 2,363,851 A * 11/1944 Barnhart .............. B62D 53/125
280/421
2,892,556 A *  6/1959 Lowe ........................ B60P 1/52
414/522

(Continued)

*Primary Examiner* — David M Fenstermacher
(74) *Attorney, Agent, or Firm* — Prakash Nama; Global IP Services, PLLC

(57) ABSTRACT

An electrically powered gear box for a semitrailer stabilizer, comprising a gear box housing; the housing is internally provided with a drive gear (10), a power output shaft (2), and a clutch mechanism ensuring transmission connection or disengagement between the drive gear (10) and the power output shaft (2); the housing is externally provided with a motor (20); and the shaft of the motor is in a transmission connection with the drive gear (10). The electrically powered gear box for the semitrailer stabilizer can be manually or electrically controlled. In the case of electrical control, the clutch mechanism causes the drive gear (10) to be in a transmission connection with the power output shaft (2); upon activating the motor (20), the motor (20) drives the power output shaft (2) to rotate via the drive gear (10) and the clutch mechanism, thus ensuring easy operation. In the case of manual control, the clutch mechanism causes the drive gear (10) and the power output shaft (2) to disengage from power, such that the power output shaft (2) can be rotated by turning a handle (9), thus being usable in the absence of a power source.

7 Claims, 6 Drawing Sheets

(56) References Cited

U.S. PATENT DOCUMENTS

| | | | | |
|---|---|---|---|---|
| 3,201,087 A | * | 8/1965 | Dalton | B60S 9/08 |
| | | | | 254/419 |
| 3,402,915 A | * | 9/1968 | Dalton | B60S 9/04 |
| | | | | 254/419 |
| 7,398,959 B2 | * | 7/2008 | VanDenberg | B60S 9/08 |
| | | | | 254/2 R |
| 2014/0157917 A1 | * | 6/2014 | Oestreich | B60S 9/08 |
| | | | | 74/89.13 |
| 2015/0224838 A1 | * | 8/2015 | Laarman | B60S 9/08 |
| | | | | 280/766.1 |

* cited by examiner

ELECTRICALLY POWERED GEAR BOX FOR A SEMITRAILER STABILIZER

BACKGROUND OF THE INVENTION

The present invention relates to the technical field of a semitrailer supporting leg, in particular to an electric gearbox of a semitrailer supporting leg.

A semitrailer supporting leg is a special part of each semitrailer, the left supporting leg and the right supporting leg of which are installed at the left and the right of the front end of the semitrailer; when the semitrailer is linked up with a tractor, the semitrailer supporting legs are ascended from the ground, and when the semitrailer is placed separately, the semitrailer supporting legs extends to the property length to keep the semitrailer body level.

For example, Chinese patent No. 99236524.4 disclosed a supporting device of a semitrailer on Jun. 28, 2000, comprising a left supporting leg and a right supporting leg as well as an intermediate connecting shaft between the left supporting leg and the right supporting leg, which can be all arranged at the front end of the semitrailer, as well as double-speed gear drive mechanisms; the legs are in an enclosed structure of internal-external double casings; a lifting screw of the internal casing is provided with a micro-adjusting mechanism, the micro-adjusting mechanism is a ball nut arranged on the top bearing plate of the internal casing, which can move in a certain distance and at a certain angle on the bearing plate. The double-speed gear drive mechanism is provided with a shifting and self-locking mechanism, which comprises large-small dual gears on an output axis and large-small dual gears on a transfer axis. In addition, the axial dimension of the former is greater than that between the large gear and the small gear, so that no vacancy exits between the high-speed shifting process and the low-speed shifting process. An internal sleeve of the existing supporting leg is adjusted in a manual mode, so that strenuous effects are relatively made for operation at a high-speed gear while more time is relatively taken for operation at a low-speed gear.

BRIEF SUMMARY OF THE INVENTION

The technical problem to be solved by the present invention is to provide an electric gearbox of a semitrailer supporting leg with simple structure and skillful operation with respect to a technical defect that the semitrailer supporting leg can only be adjusted manually, so that the semitrailer supporting leg can be adjusted in either an electric mode or a manual mode, without power supply.

The technical scheme adopted for solving the technical problems by the invention is that: an electric gearbox of a semitrailer supporting leg includes a gearbox shell, wherein a driving gear, a power output shaft and a clutch mechanism which enables the driving gear and the power output shaft to be connected in a driving way or be separated from each other are arranged in the gearbox shell, a motor is arranged in the gearbox shell, and a motor shaft is connected with the driving gear in a driving way.

wherein the clutch mechanism comprises a moving block, a transmission gear and an output shaft driving gear, the moving block is connected with a shift mechanism controlling the oscillation of the moving block, the transmission gear is rotationally connected to the moving block, the output shaft driving gear is coaxially connected with the power output shaft and is engaged with the transmission gear, and the transmission gear is connected with or separated from the driving gear when the moving block is oscillating.

wherein the transmission gear comprises a high-speed transmission gear, a small transmission gear and a low-speed transmission gear, the small transmission gear and the low-speed transmission gear are coaxially connected, the high-speed transmission gear and the small transmission gear are engaged with the output shaft driving gear at the same time, the driving gear is coaxially provided with a high-speed driving gear and a low-speed driving gear, when the transmission gear is connected with the driving gear, the high-speed transmission gear is engaged with the high-speed driving gear, or when the transmission gear is connected with the driving gear, the low-speed transmission gear is engaged with the low-speed driving gear.

wherein The shift mechanism is arranged at the upper part of the shell and comprises a shift wheel, an eccentric shaft and a shift handle, the shift wheel is rotationally arranged on the surface of the shell, the eccentric shaft is located in the shell and is connected with the shift wheel in an eccentric way, the shift handle is located outside the shell and is connected with the center of the shift wheel; the moving block corresponding the eccentric shaft is provided with an oblong hole, and the eccentric shaft is inserted in the oblong hole.

wherein A hanging rod is arranged on the surface of the moving block, and a locking tension spring is connected between the hanging rod and the eccentric shaft.

wherein The moving block comprises a driving moving block a driven moving block and a separator, the driving moving block is connected with the power output shaft in a driving way, the separator is arranged between the driving moving block and the driven moving block, the driving moving block and the driven moving block form an interlayer, and the output shaft driving gear, the high-speed transmission gear, the small transmission gear and the low-speed transmission gear are arranged in the interlayer.

wherein The shell is formed by connecting a bottom shell and a surface cover, a motor base is arranged at the lower end of the shell and is provided with a through hole communicating with the inside of the shell, the shell is connected to the bottom of the motor base, and a groove is arranged in the outer surface of the surface cover.

wherein Two ends of the power output shaft extend out of the shell, wherein one end of the power output shaft is provided with power output teeth.

wherein The supporting leg comprises an outer sleeve, a bearing plate, a screw driving bevel gear, a supporting leg transmission shaft and a transmission shaft driving gear. The bearing plate is welded to the upper end in the outer sleeve, the screw driving bevel gear and the supporting leg transmission shaft are arranged above the bearing plate in sequence, the supporting leg transmission shaft is rotationally arranged on the upper end of the outer sleeve in a transverse direction, the transmission shaft driving gear is fixedly connected with the supporting leg transmission shaft and is coaxially provided with a transmission bevel gear, the transmission bevel gear is engaged with the screw driving bevel gear, the shell is fixedly arranged on the outer wall of the outer sleeve, and one end of the power output shaft with the power output teeth extends into the outer sleeve and is engaged with the transmission shaft driving gear.

The present invention has the following beneficial effects.

(1) The electric gearbox of the semitrailer supporting leg has two control modes, i.e., a manual control mode and an electric control mode. When the electric control mode is needed, the driving gear is connected with the power output shaft in the driving way through the clutch mechanism, the motor is started up, the motor drives the power output shaft to rotate through the driving gear and the clutch mechanism and the operation is labor-saving; and when the manual control mode is needed, the clutch mechanism enables the driving gear and the power output shaft to be separated from respective power, and the power output shaft can be operated to rotate through a handle to meet the demand of use under the situation of no power supply.

(2) The clutch mechanism includes a high-speed transmission gear and a low-speed transmission gear which are connected with the power output shaft in a driving way, the driving gear is coaxially provided with a high-speed driving gear and a low-speed driving gear, when the transmission gear is connected with the driving gear, the high-speed transmission gear is engaged with the high-speed driving gear, or when the transmission gear is connected with the driving gear, the low-speed transmission gear is engaged with the low-speed driving gear, so as to drive at a high-speed gear or a low-speed gear under the electric control mode.

(3) A shift handle of a shift mechanism is located at the upper part of the gearbox to prevent lubricating oil from leaking from a junction of the shift handle and the gearbox shell.

DETAILED DESCRIPTION OF THE INVENTION

Figure 1:
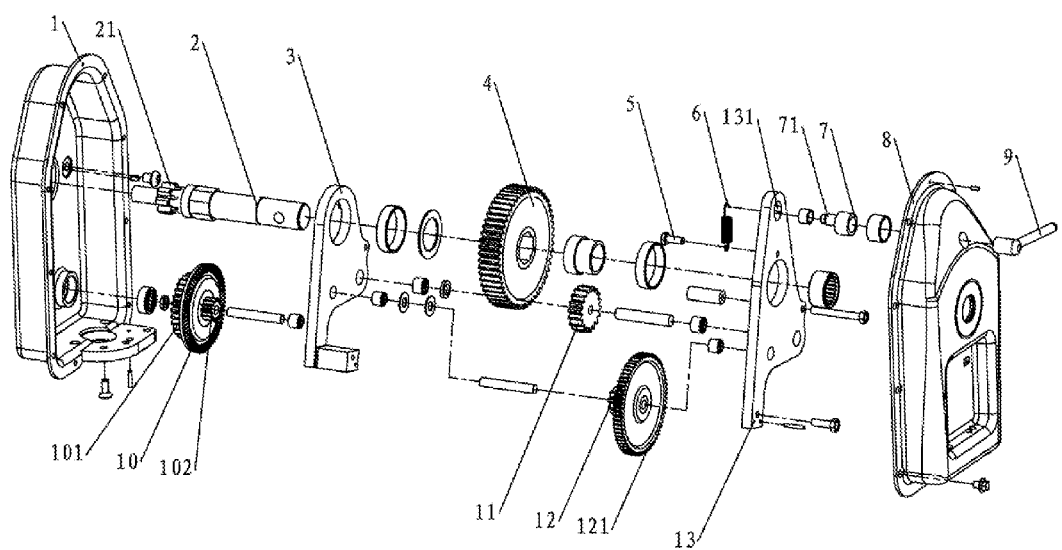
FIG. 1 is a schematic diagram of a breakdown structure of one embodiment of the present invention.
Figure 2:
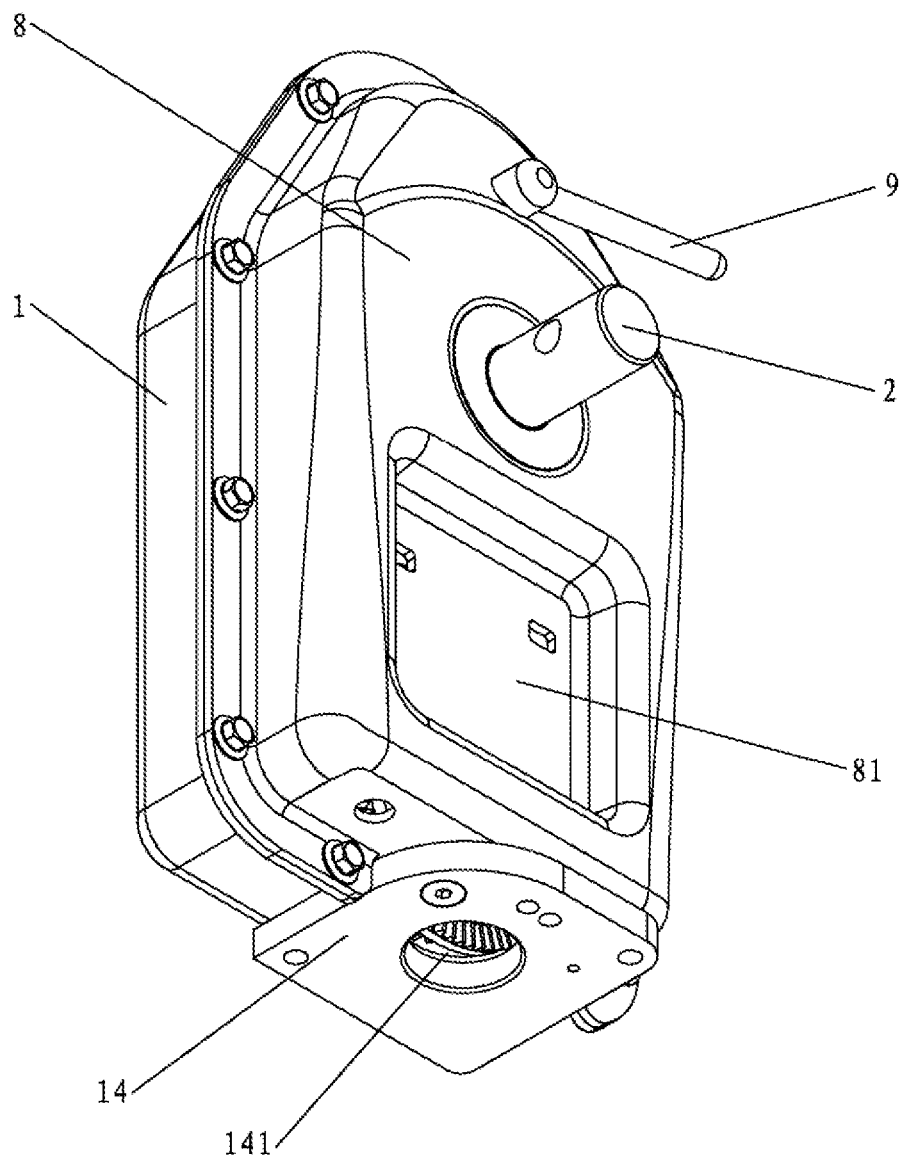
FIG. 2 is a schematic structural diagram after assembling FIG. 1.
Figure 6:
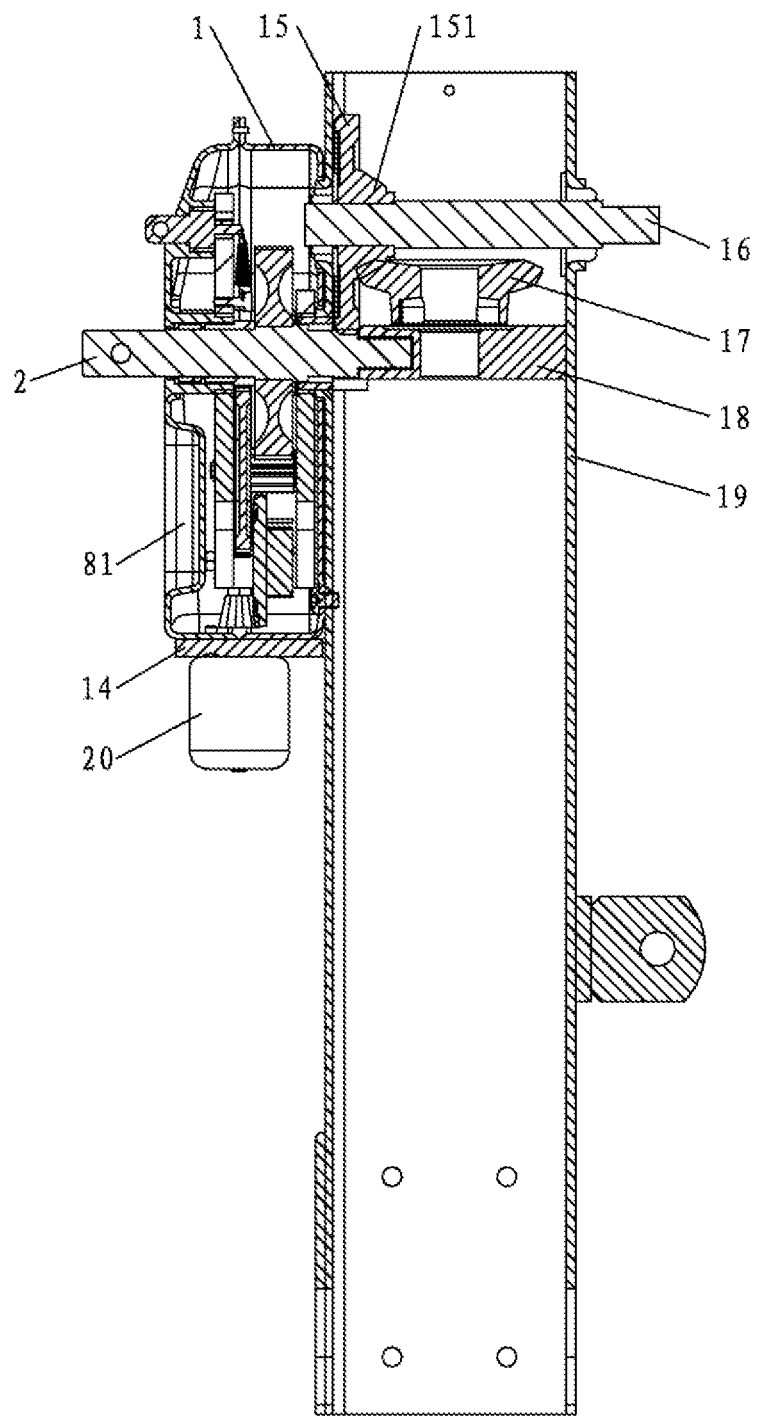
FIG. 6 is a schematic structural diagram of a connection status of the gearbox and the supporting leg.

The present invention is further described hereunder by reference to the accompanying diagrams and embodiments:

As shown in FIG. 1, FIG. 2 and FIG. 6, an electric gearbox of a semitrailer supporting leg comprises a gearbox shell. A driving gear 10, a power output shaft 2 and a clutch mechanism which enables the driving gear 10 and the power output shaft 2 to be connected in a driving way or be separated from each other are arranged in the gearbox shell. A motor 20 is arranged in the gearbox shell. A motor shaft is connected with the driving gear 10 in a driving way.

The clutch mechanism comprises a moving block, a transmission gear and an output shaft driving gear 4, the moving block is connected with a shift mechanism controlling the oscillation of the moving block, the transmission gear is rotationally connected to the moving block, the output shaft driving gear 4 is coaxially connected with the power output shaft 2 and is engaged with the transmission gear, and the transmission gear is connected with or separated from the driving gear 10 when the moving block is oscillating.

The transmission gear comprises a high-speed transmission gear 11, a small transmission gear 12 and a low-speed transmission gear 121, the small transmission gear 12 and the low-speed transmission gear 121 are coaxially connected, the high-speed transmission gear 11 and the small transmission gear 12 are engaged with the output shaft driving gear 4 at the same time, the driving gear 10 is coaxially provided with a high-speed driving gear 101 and a low-speed driving gear 102, when the transmission gear is connected with the driving gear 10, the high-speed transmission gear 11 is engaged with the high-speed driving gear 101, or when the transmission gear is connected with the driving gear 10, the low-speed transmission gear 121 is engaged with the low-speed driving gear 102.

The shift mechanism is arranged at the upper part of the shell and comprises a shift wheel 7, an eccentric shaft 71 and a shift handle 9, the shift wheel is rotationally arranged on the surface of the shell, the eccentric shaft 71 is located in the shell and is connected with the shift wheel 7 in an eccentric way, the shift handle 9 is located outside the shell and is connected with the center of the shift wheel 7; the moving block corresponding the eccentric shaft 71 is provided with an oblong hole 131, and the eccentric shaft 71 is inserted in the oblong hole 131.

A hanging rod 5 is arranged on the surface of the moving block, and a locking tension spring 6 is connected between the hanging rod 5 and the eccentric shaft 71.

The moving block comprises a driving moving block 13, a driven moving block 3 and a separator, the driving moving block 13 is connected with the power output shaft 2 in a driving way, the separator is arranged between the driving moving block 13 and the driven moving block 3, the driving moving block 13 and the driven moving block 3 form an interlayer, and the output shaft driving gear 4, the high-speed transmission gear 11, the small transmission gear 12 and the low-speed transmission gear 121 are arranged in the interlayer.

The shell is formed by connecting a bottom shell 1 and a surface cover 8, a motor base 14 is arranged at the lower end of the shell and is provided with a through hole 141 communicating with the inside of the shell, the shell 20 is connected to the bottom of the motor base 14, and a groove 81 is arranged in the outer surface of the surface cover 8.

Two ends of the power output shaft 2 extend out of the shell, wherein one end of the power output shaft 2 is provided with power output teeth 21.

The supporting leg comprises an outer sleeve 19, a bearing plate 18, a screw driving bevel gear 17, a supporting leg transmission shaft 16 and a transmission shaft driving gear 15. The bearing plate 18 is welded to the upper end in the outer sleeve 19, the screw driving bevel gear 17 and the supporting leg transmission shaft 16 are arranged above the bearing plate 18 in sequence, the supporting leg transmission shaft 16 is rotationally arranged on the upper end of the outer sleeve 19 in a transverse direction, the transmission shaft driving gear 15 is fixedly connected with the supporting leg transmission shaft 16 and is coaxially provided with a transmission bevel gear 151, the transmission bevel gear 151 is engaged with the screw driving bevel gear 17, the shell is fixedly arranged on the outer wall of the outer sleeve 19, and one end of the power output shaft 2 with the power output teeth 21 extends into the outer sleeve 19 and is engaged with the transmission shaft driving gear 15.

Figure 3:
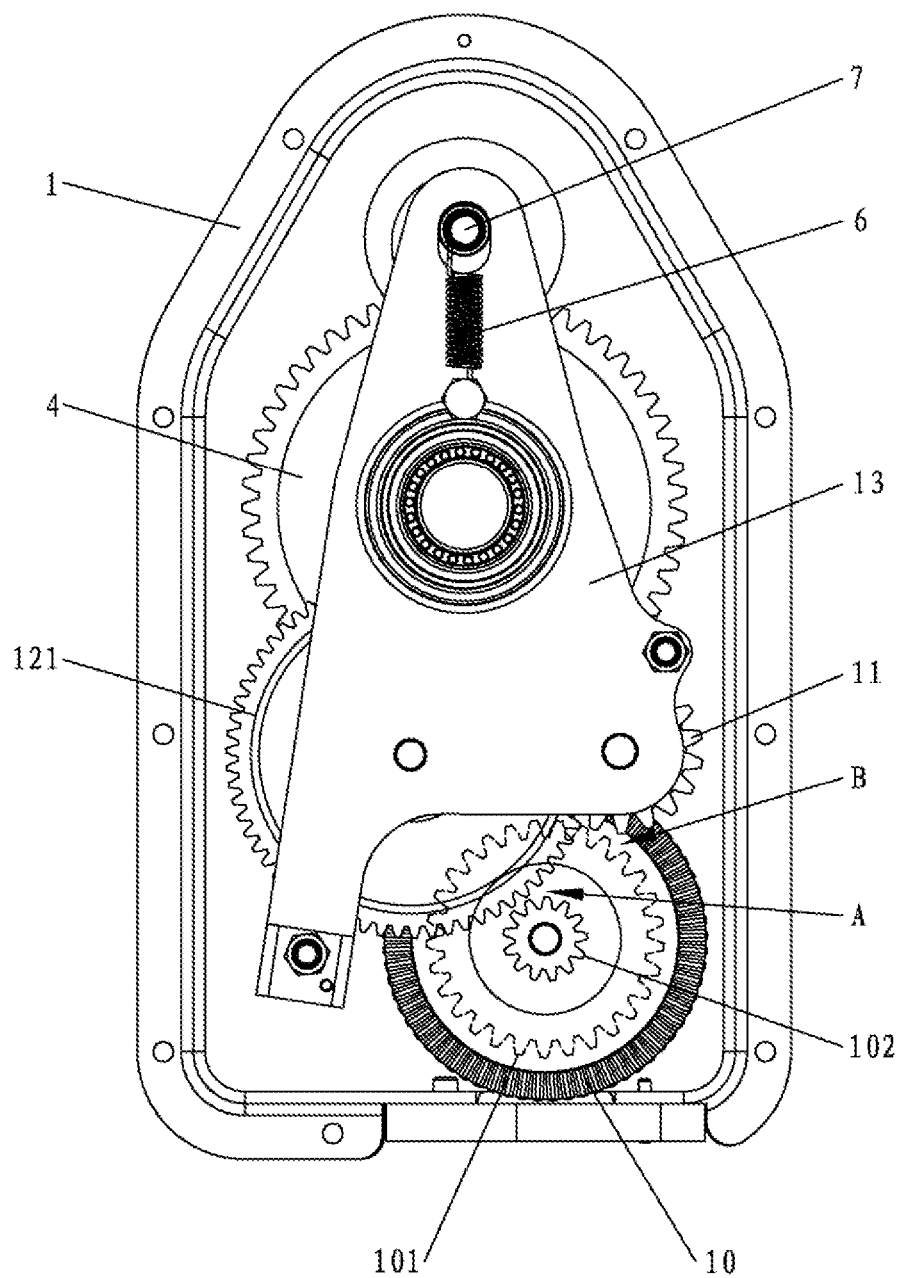
FIG. 3 is a schematic structural diagram of a neutral gear status of a gearbox and after opening a surface cover.
Figure 4:
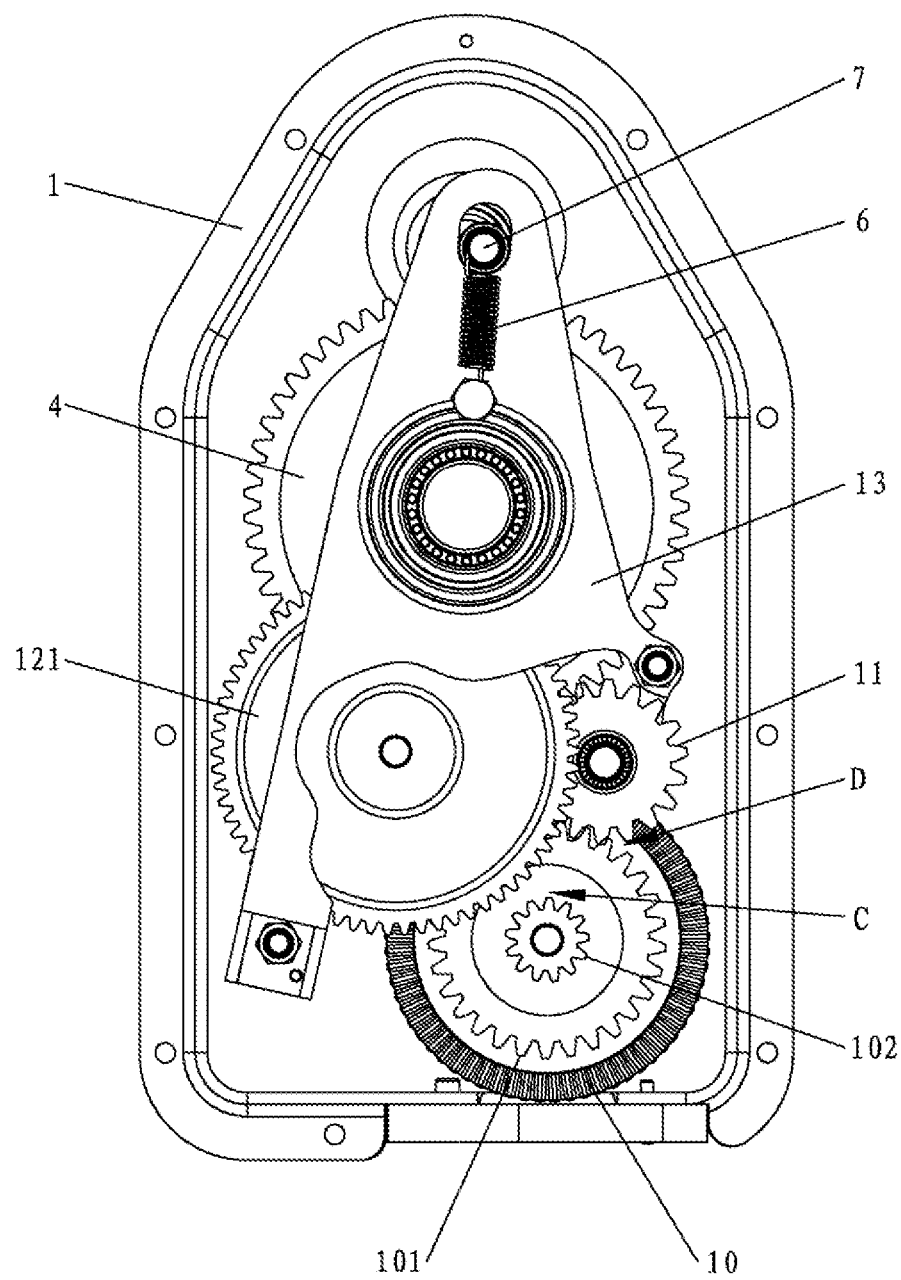
FIG. 4 is a schematic structural diagram of a high-speed gear status of the gearbox and after opening the surface cover.
Figure 5:
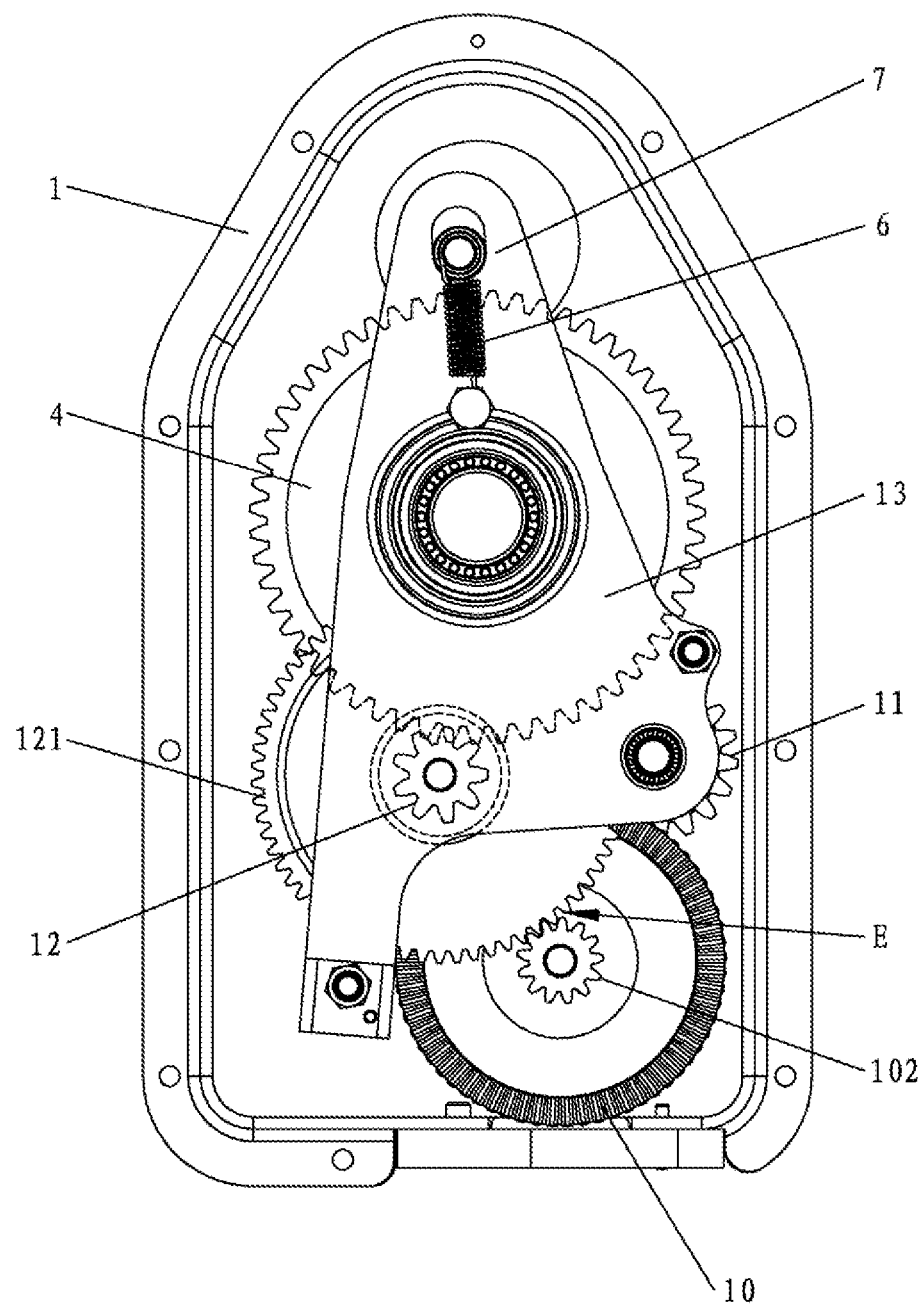
FIG. 5 is a schematic structural diagram of a low-speed gear status of the gearbox and after opening the surface cover.

The working principle is that: see FIG. 3, when the shift handle is turned to the middle in a neutral gear status, the low-speed transmission gear 121 in the moving block is separated from the low-speed driving gear 102 of the driving gear 10 (see the position appointed by arrow A in FIG. 3); meanwhile, the high-speed transmission gear 11 in the moving block is also separated from the high-speed driving gear 101 of the driving gear 10 (see the position appointed by arrow B in FIG. 3), the power output shaft can be driven by hand to rotate at this time to achieve manual adjustment. See FIG. 4, when the shift handle is turned to the right in a high-speed gear status, the low-speed transmission gear 121 in the moving block is separated from the low-speed driving gear 102 of the driving gear 10 (see the position appointed by arrow C in FIG. 4); meanwhile, the high-speed transmission gear 11 in the moving block is also separated from the high-speed driving gear 101 of the driving gear 10 (see the position appointed by arrow D in FIG. 4), and the supporting leg can use the high-speed gear and rapidly adjusted by the motor in case of being in a hanging status. See FIG. 5, when the shift handle is turned to the left in a low-speed gear status, the low-speed transmission gear 121 in the moving block is separated from the low-speed driving gear 102 of the driving gear 10 (see the position appointed by arrow E in FIG. 5); meanwhile, the high-speed transmission gear 11 in the moving block is also separated from the high-speed driving gear 101 of the driving gear 10 (see the position appointed by arrow B in FIG. 3), and the supporting leg can use the low-speed gear and slightly adjusted by the motor in case of contacting with the ground in a bearing status.

What is claimed is:

1. An electric gearbox of a semitrailer supporting leg, comprising a gearbox shell, wherein a driving gear, a power output shaft and a clutch mechanism which enables the driving gear and the power output shaft to be detachably connected with each other are arranged in the gearbox shell, a motor is arranged in the gearbox shell, and a motor shaft is connected with the driving gear; the clutch mechanism comprises a moving block, a transmission gear and an output shaft driving gear, the moving block is connected with a shift mechanism controlling the oscillation of the moving block, the transmission gear is rotationally connected to the moving block, the output shaft driving gear is coaxially connected with the power output shaft and is engaged with the transmission gear, and the transmission gear is detachably connected with the driving gear when the moving block is oscillating; the transmission gear comprises a high-speed transmission gear, a small transmission gear and a low-speed transmission gear, the small transmission gear and the low-speed transmission gear are coaxially connected, the high-speed transmission gear and the small transmission gear are engaged with the output shaft driving gear at the same time, the driving gear is coaxially provided with a high-speed driving gear and a low-speed driving gear, connection of the transmission gear with the driving gear achieves one of an engagement between the high-speed transmission gear with the high-speed transmission gear and an engagement between the low-speed transmission gear with the low-speed driving gear.

2. The electric gearbox of the semitrailer supporting leg according to claim 1, wherein the shift mechanism is arranged at the upper part of the shell and comprises a shift wheel, an eccentric shaft and a shift handle, the shift wheel is rotationally arranged on the surface of the shell, the eccentric shaft is located in the shell and is connected with the shift wheel in an eccentric way, the shift handle is located outside the shell and is connected with the center of the shift wheel; the moving block corresponding the eccentric shaft is provided with an oblong hole, and the eccentric shaft is inserted in the oblong hole.

3. The electric gearbox of the semitrailer supporting leg according to claim 2, wherein a hanging rod is arranged on the surface of the moving block, and a locking tension spring is connected between the hanging rod and the eccentric shaft.

4. The electric gearbox of the semitrailer supporting leg according to claim 1, wherein the moving block comprises a driving moving block, a driven moving block and a separator, the driving moving block is connected with the power output shaft, the separator is arranged between the driving moving block and the driven moving block, the driving moving block and the driven moving block form an interlayer, and the output shaft driving gear, the high-speed transmission gear, the small transmission gear and the low-speed transmission gear are arranged in the interlayer.

5. The electric gearbox of the semitrailer supporting leg according to claim 1, wherein the shell is formed by connecting a bottom shell and a surface cover, a motor base is arranged at the lower end of the shell and is provided with a through hole communicating with the inside of the shell, the shell is connected to the bottom of the motor base, and a groove is arranged in the outer surface of the surface cover.

6. The electric gearbox of the semitrailer supporting leg according to claim 1, wherein two ends of the power output shaft extend out of the shell, wherein one end of the power output shaft is provided with power output teeth.

7. The electric gearbox of the semitrailer supporting leg according to claim 1, wherein the supporting leg comprises an outer sleeve, a bearing plate, a screw driving bevel gear, a supporting leg transmission shaft and a transmission shaft driving gear, the bearing plate is welded to the upper end in the outer sleeve, the screw driving bevel gear and the supporting leg transmission shaft are arranged above the bearing plate in sequence, the supporting leg transmission shaft is rotationally arranged on the upper end of the outer sleeve in a transverse direction, the transmission shaft driving gear is fixedly connected with the supporting leg transmission shaft and is coaxially provided with a transmission bevel gear, the transmission bevel gear is engaged with the screw driving bevel gear, the shell is fixedly arranged on the outer wall of the outer sleeve, and one end of the power output shaft with the power output teeth extends into the outer sleeve and is engaged with the transmission shaft driving gear.

\* \* \* \* \*